A. ROSENTHAL.
PNEUMATIC ELEVATOR.
APPLICATION FILED MAY 7, 1908.
931,222.
Patented Aug. 17, 1909.
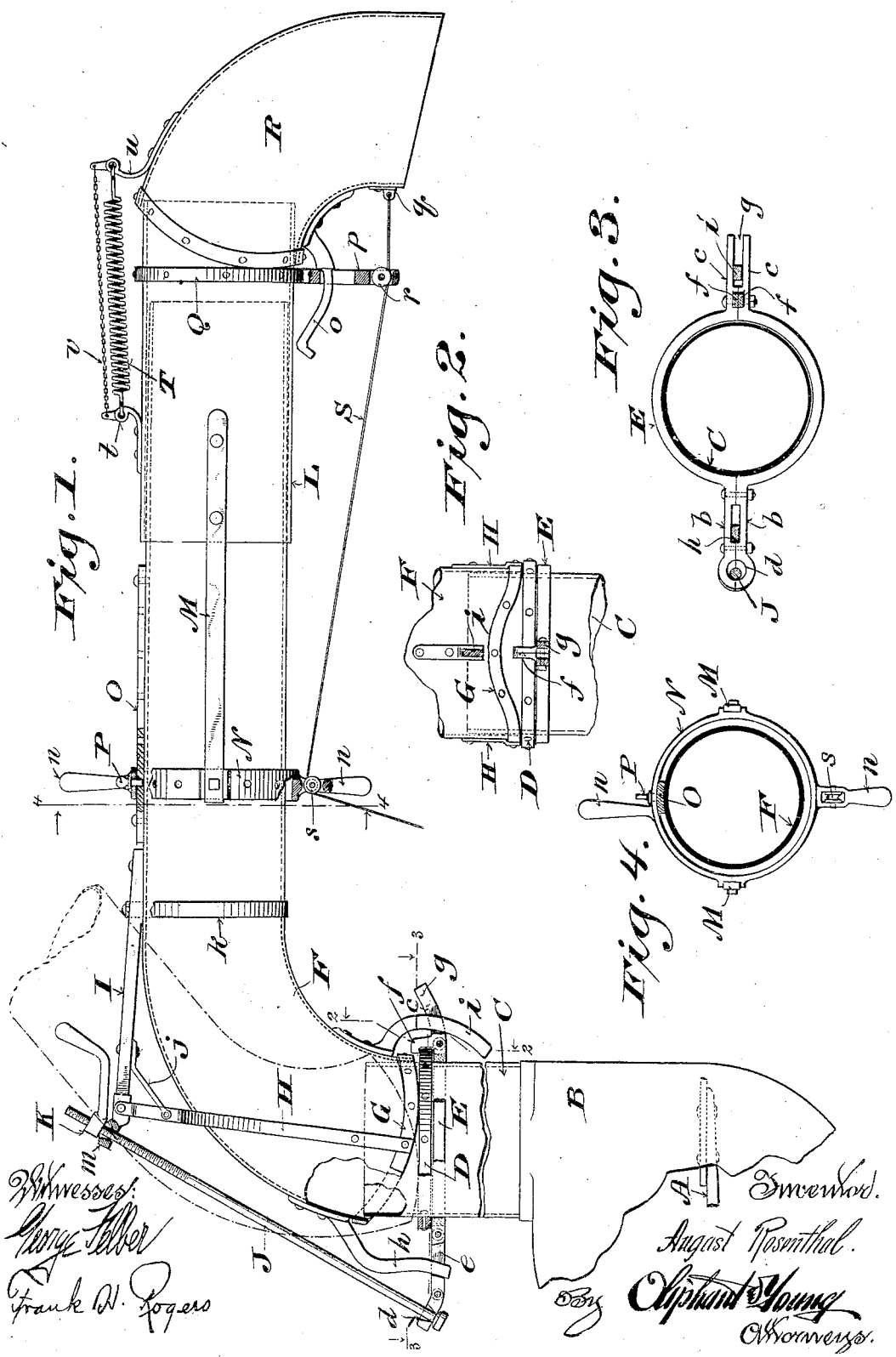

UNITED STATES PATENT OFFICE.

AUGUST ROSENTHAL, OF WEST ALLIS, WISCONSIN.

PNEUMATIC ELEVATOR.

No. 931,222.  Specification of Letters Patent.  Patented Aug. 17, 1909.

Application filed May 7, 1908. Serial No. 431,476.

*To all whom it may concern:*

Be it known that I, AUGUST ROSENTHAL, a citizen of the United States, and resident of West Allis, in the county of Milwaukee and State of Wisconsin, have invented certain new and useful Improvements in Pneumatic Elevators; and I do hereby declare that the following is a full, clear, and exact description thereof.

My invention has especial reference to pneumatic-elevators employed in connection with corn-huskers and shredders to discharge the shredded material, and it consists in what is herein particularly set forth with reference to the accompanying drawings and pointed out in the claims herewith; its primary object being to provide for ready adjustment to various elevations of preferably extensible and rotary adjustable spouts of said elevators, and also to provide these spouts with preferably rotary adjustable deflecting nozzles that may be independently adjusted to various elevations; the means for varying the elevations of said spouts and their nozzles being simple, economical and efficient.

Figure 1 of the drawings represents a partly sectional side elevation of a fragment of a pneumatic-elevator embodying my improvements, Fig. 2, a partly sectional elevation of a detail of the elevator indicated by lines 2—2 in Fig. 1, and Figs. 3 and 4, sectional views respectively indicated by lines 3—3 and 4—4 in said Fig. 1.

Referring by letter to the drawings, A indicates a fragment of an air-blast fan, and B a fragment of the fan-casing provided with an annular upwardly projecting vent C having an outer collar D fast thereon a suitable distance below its outlet. Loose on the fan-casing vent below its collar is a split-ring E each section of which is provided with diametrically opposite lateral-arms *b*, *c*, and the arms of one ring-section are bolted to those of the other ring-section. The arms *b* of the ring-sections are inwardly recessed to form an eye *d* and a slot *e* when these arms are matched together, the eye portions of said arms being preferably upturned. The arms *c* of the ring-sections are formed with upper hooks *f* engageable with the collar D, and are inwardly recessed to form a slot *g* outward from said hooks, the slot-ends of these arms being preferably upturned.

Supported on the collar D is an outwardly banded rocker-terminal of an elbowed spout-section F that is annular in cross-section throughout, its elbow being engaged by the upper end of the vent C of the fan-casing and provided with fingers *h*, *i*, that have play in the slots *e*, *g*, formed by the matching arms of the split-ring E aforesaid.

Rigidly secured to opposite sides of the rocker-band G of the spout-section elbow and to this elbow itself are supports H attached to an eye-arm I likewise secured on the straight portion of said spout-section. A brace *j* is connected to the supports and eye-arm, and a stay-band *k* encompasses the spout-section and said arm. The eye-end *m* of the arm I is parallel to the eye *d* aforesaid when the straight portion of the elbowed spout-section F is approximately horizontal, and extending through both eyes is a screw rod J headed at its lower end. Run on the upper screw-end of the rod is a cranked adjusting nut K opposing the eye-end *m* of the arm I, and this nut is manipulated to vary the elevation of the elbowed spout-section F, the limits of its elevation being determined by the contour of its rocker-terminal.

From the foregoing it will be understood that the split-ring E has rotary support in connection with the stationary collar D and the screw-rod J, and because of the engagement of the fingers *h*, *i*, of the spout-section F with the slots of the arm-projections of said ring provision is had for rotary adjustment of said spout-section. By means of suitable gearing (not shown) it is possible to impart an oscillative movement to the ring E and spout-section F, whenever desirable, it being common practice to oscillate the discharge spouts of pneumatic elevators attached to threshing-machines and other machines.

A straight spout-section L is shown telescoped on the elbowed spout-section F and connected by stiff straps M with a rotary adjustable ring N encircling said elbowed section over a bar O fast on the same and provided with apertures at intervals thereof for the engagement of a pin P inserted through any one of several apertures at intervals of said ring, whereby provision is had for adjustment of the spout-section L longitudinally of the one F and circumferentially of the same. Handles *n* are provided in connection with the ring N to facilitate manipulation of the same. The spout-section L is provided with an outer collar Q opposing the outwardly banded rocker terminal of an elbow nozzle R having a finger *o* engageable with a play-slot in a lateral arm *p* of said collar, the nozzle finger being fashioned to limit its movement in opposite directions. An eye-bracket *q* of the nozzle is connected to a flexible runner S trained on sheaves *r*, *s*, housed in slots of the collar-arm *p* and one of the ring-handles *n*, pull of said flexible device being against resistance of a spiral-spring T connecting bracelets *t u* that are rigid on the spout-section L and the nozzle R aforesaid, a chain *v* or other flexible device of suitable length being employed in connection with the brackets to draw taut with the expansion of the spring and thereby effectually prevent a disengagement of said nozzle from said spout-section. The nozzle having been rocked in one direction by pull on the runner S, the contraction of the spring T will cause its automatic rock in the opposite direction when said runner is slackened. The adjustable spout-section L by which the spout as a whole is lengthened or shortened may be omitted, it being practical to put the spout-nozzle R in rotary adjustable connection with the upper end of the spout-section F, by means similar to those employed for the rotary adjustable support of said spout-section F on the vent C of the fan-casing, in which case the spring T attached to said nozzle will be connected to an equivalent of the ring E movable in connection with a rocker opposing collar similar to the one Q then rigidly secured on the aforesaid spout-section F adjacent to said upper end of same.

Attention is called to the fact that the construction and arrangement of parts with reference to rotary adjustment of the spout-section L is such that there is nothing to interfere with the movement of said spout-section throughout a full circle in either direction.

The vent of the fan-casing as well as the aforesaid nozzle are each virtually a section of the elevator-spout and my improvements are generic to such spouts in so far as concerns a pair of sections of same loosely engaging one another and provided with opposite bearing-surfaces, which bearing-surfaces of one section of the pair are in contact with those of the other section of said pair, the contour of the opposing bearing-surfaces being such as to provide for a rocking joint between said spout-sections that may be either annular or angular in cross-section. Each bearing-surface of one spout-section is a plane and the opposing bearing-surface of the other spout-section in the pair is a curve as herein shown, this being an essential feature of my invention, as distinguished from a conical end of one spout-section engaged by a spherical enlargement of another spout-section that may or may not be provided with pintles upon which to mount the former spout-section.

I claim:

1. A pneumatic-elevator comprising a fan-casing having an annularly upwardly projecting vent provided with a rigid outer collar, the upper face of which collar is plane; a discharge-spout elbow having a vent-straddling terminal presenting opposite parallel rocker surfaces in contact with said face of the collar, and means controlling rocking adjustment of the elbow to vary elevation of the spout.

2. A pneumatic-elevator comprising a fan-casing having an annular upwardly projecting vent provided with a rigid outer collar, the upper face of which collar is plane; a discharge-spout elbow having a vent-straddling terminal presenting opposite parallel rocker surfaces in contact with said face of the collar, means by which the elbow is put in rotary adjustable connection with said collar, and means controlling rocking adjustment of said elbow to vary elevation of the spout.

3. A pneumatic-elevator comprising a fan-casing having an upwardly projecting annular vent provided with a rigid outer collar, a discharge-spout elbow having a rocker-terminal supported on the collar to encompass said vent, a loose ring in hook connection with said collar below the same and provided with slotted lateral arms, fingers in connection with the elbow engaging play-slots in said arms of the ring, a screw-rod guided in an eye of one of the ring-arms and an eye-arm provided in connection with the spout, and an adjusting-nut on the rod in opposition to its upper guide-eye, this rod being headed in opposition to the lower guide-arm for same.

4. A pneumatic-elevator comprising a fan-casing having an upwardly projecting annular vent provided with a rigid outer collar, a ring loose on the vent below the collar and provided with a hook engaging said collar, said ring being also provided with slotted diametrically opposite lateral arms one of which has an eye in an end thereof; a discharge-spout elbow having a rocker terminal supported on said collar to encompass said vent, fingers in connection with the elbow engaging the slots in the ring-arms, supports in rigid connection with said elbow an arm of the spout braced in connection with the supports and provided with an eye, a screw-rod guided in said eyes, and an adjusting nut on the upper end of the rod in opposition to the eye-arm of the spout, this rod being headed in opposition to the eye-arm of the aforesaid ring.

5. A pneumatic-elevator comprising a fan-casing having an annular upwardly projecting vent provided with a rigid outer collar, the upper face of which collar is a plane; an elbowed discharge-spout having a vent-straddling terminal presenting opposite parallel rocker surfaces in contact with said face of the collar, another spout-section slidably adjustable on the straight portion of the elbow-section to vary the length of the spout as a whole, a deflecting nozzle in connection with the slidably adjustable section, and means controlling rocking adjustment of said elbow section to vary elevation of said spout.

6. A pneumatic-elevator comprising a fan-casing having an annular upwardly projecting vent provided with a rigid outer collar, the upper face of which collar is a plane; an elbowed discharge-spout having a vent-straddling terminal presenting opposite parallel rocker surfaces in contact with said face of the collar, another spout-section in rotary adjustable connection with the straight portion of the elbowed spout-section and having an elbow discharge nozzle, and means controlling rocking adjustment of said elbowed section to vary elevation of the spout as a whole.

7. A pneumatic-elevator comprising a fan-casing having an upwardly extending annular vent provided with a rigid outer flat collar, an elbowed discharge-spout section having a rocker terminal supported on the collar, another spout-section in slidable and rotary adjustable connection with the straight portion of the one aforesaid, an elbow-nozzle provided in connection with this slidable and rotary adjustable spout-section, and means controlling rocking adjustment of said elbowed spout-section to vary elevation of the spout as a whole.

8. A pneumatic-elevator comprising a discharge-spout adjustable to various elevations and provided with a rigid outer collar, an elbow nozzle having a rocker terminal opposing the collar, and means controlling rocking adjustment of the nozzle on said collar.

9. A pneumatic-elevator comprising a discharge-spout adjustable to various elevations and provided with a rigid outer collar, an elbow nozzle in rotary adjustable connection with the spout and having a rocker-terminal opposing the collar, and means controlling rocking adjustment of the elbow.

10. A pneumatic-elevator comprising a discharge-spout adjustable to various elevations and provided with a rigid outer collar, an elbow nozzle encompassing the spout and having a rocker-terminal opposing said collar, a spiral-spring in connection with said spout and nozzle, and means for deflecting said nozzle against resistance of the spring.

11. A pneumatic-elevator comprising a discharge-spout adjustable to various elevations and provided with a rigid outer collar, an elbow nozzle encompassing the spout and having a rocker-terminal opposing said collar, a spiral-spring in connection with said spout and nozzle, means for deflecting said nozzle against resistance of the spring, and means limiting expansion of said spring.

12. A pneumatic elevator comprising a discharge-spout adjustable to various elevations and provided with a rigid outer collar having a slotted arm, a spring-controlled elbow nozzle encompassing the spout and having a rocker terminal opposing the collar, a nozzle stop-finger guided in the slot of the collar-arm, and means for deflecting the nozzle against its controlling spring.

13. A pneumatic-elevator comprising a rotary adjustable discharge-spout adjustable to various elevations and provided with a rigid outer collar, an elbow nozzle encompassing the spout and having a rocker-terminal opposing said collar, and means controlling rocker-adjustment of the nozzle.

14. A pneumatic-elevator spout comprising a pair of sections loosely engaging one within the other and each provided with opposite bearing surfaces, those of one spout-section being planes and those of the other spout-section rockers in contact with said planes, whereby a rocking joint is had of said spout-sections.

In testimony that I claim the foregoing I have hereunto set my hand at Milwaukee in the county of Milwaukee and State of Wisconsin in the presence of two witnesses.

AUGUST ROSENTHAL.

Witnesses:
 JAMES F. TROTTMAN,
 ANNABEL HICKEY.